US008442325B2

(12) United States Patent
Hong et al.

(10) Patent No.: US 8,442,325 B2
(45) Date of Patent: May 14, 2013

(54) METHOD FOR RECOGNIZING MUSIC SCORE IMAGE WITH AUTOMATIC ACCOMPANIMENT IN MOBILE DEVICE

(75) Inventors: Tae-Hwa Hong, Seoul (KR); Byung-Jun Son, Seoul (KR); Soo-Kyun Kim, Seoul (KR); Sung-Dae Cho, Yongin-si (KR); Guee-Sang Lee, Gwangju (KR); Sung-Ryul Oh, Gwangju (KR); Kun-Hee Park, Gwangju (KR)

(73) Assignees: Samsung Electronics Co., Ltd., Samsung-ro, Yeongtong-gu, Suwon-si, Gyeonggi-do (KR); Industry Foundation of Chonnam National University, Yongbong-Dong, Buk-Gu, Gwangju (KR)

( * ) Notice: Subject to any disclaimer, the term of this patent is extended or adjusted under 35 U.S.C. 154(b) by 888 days.

(21) Appl. No.: 12/369,113

(22) Filed: Feb. 11, 2009

(65) Prior Publication Data
US 2009/0202106 A1 Aug. 13, 2009

(30) Foreign Application Priority Data

Feb. 12, 2008 (KR) ........................ 10-2008-0012784

(51) Int. Cl.
- *G06K 9/46* (2006.01)
- *G06K 9/48* (2006.01)
- *G06K 9/34* (2006.01)
- *G06K 9/00* (2006.01)

(52) U.S. Cl.
USPC ........... 382/190; 382/100; 382/113; 382/168; 382/170; 382/174; 382/181

(58) Field of Classification Search ................. 382/190, 382/100, 113, 168, 170, 174, 181
See application file for complete search history.

(56) References Cited

U.S. PATENT DOCUMENTS

| 4,489,636 | A | * | 12/1984 | Aoki et al. | ................ | 84/618 |
| 5,077,805 | A | * | 12/1991 | Tan | .......................... | 382/137 |

(Continued)

FOREIGN PATENT DOCUMENTS

JP 2007122277 A * 5/2007

OTHER PUBLICATIONS

Dannenberg, et al. "Music Score Alignment and Computer Accompaniment." Commun. ACM. (2006): 1-8. Print.*

(Continued)

*Primary Examiner* — Michael A Newman
(74) *Attorney, Agent, or Firm* — Cha & Reiter, LLC

(57) ABSTRACT

A method for recognizing a music score included in an image and various information included in the music score, which may be obtained through a camera provided in a mobile terminal without requiring a separate editing program. The method includes detecting a region with staff lines from the image including the music score; detecting a region with an accompaniment chord from the image by taking the region with the staff lines and a region with a musical note into consideration; extracting and removing the staff lines from the music score included in the image; recognizing the musical note by extracting the musical note from the image, from which the staff lines have been removed; recognizing the accompaniment chord by extracting the accompaniment chord from the image, from which the staff lines have been removed; and generating data for reproducing a sound source corresponding to the musical note and accompaniment chord.

20 Claims, 14 Drawing Sheets

U.S. PATENT DOCUMENTS

| | | | | |
|---|---|---|---|---|
| 5,706,363 | A * | 1/1998 | Kikuchi | 382/113 |
| 5,777,253 | A * | 7/1998 | Kurebayashi | 84/613 |
| 5,825,905 | A * | 10/1998 | Kikuchi | 382/113 |
| 5,864,631 | A * | 1/1999 | Shutoh | 382/113 |
| 5,883,970 | A * | 3/1999 | Kikuchi | 382/113 |
| 6,046,394 | A * | 4/2000 | Hino | 84/477 R |
| 6,143,972 | A * | 11/2000 | Ladyjonsky | 84/615 |
| 6,580,805 | B1 * | 6/2003 | Nakano | 382/100 |
| 2003/0059115 | A1 * | 3/2003 | Nakagawa | 382/197 |
| 2006/0150803 | A1 * | 7/2006 | Taub | 84/616 |

OTHER PUBLICATIONS

Bainbridge, et al. "The Challenge of Optical Music Recognition." computer and Humanities. 35. (2001): 95-121. Print.*

Modayur, et al. "MUSER: A Prototype Musical Score Recognition System using Mathematical Morphology." Machine Vision and Applications. 6. (1993): 141-150. Print.*

Bainbridge, et al. "Dealing with Superimposed Objects in Optical Music Recognition." IPA97. 443. (1997): 756-760. Print.*

Bainbridge, et al. "The Challenge of Optical Music Recognition." Computers and the Humanities. 35. (2001): 95-121. Print.*

Bainbridge, et al. "An Extensible Optical Music Recognition System." . The University of Waikato, Sep. 5, 1997. Web. Jan. 13, 2013. <http://www.cs.waikato.ac.nz/~davidb/publications/acsc96/>.*

Bainbridge, et al. "A Music Notation Construction Engine for Optical Music Recognition." Softw. Pract. Exper.. 33. (2003): 173-200. Print.*

* cited by examiner

METHOD FOR RECOGNIZING MUSIC SCORE IMAGE WITH AUTOMATIC ACCOMPANIMENT IN MOBILE DEVICE

CLAIM OF PRIORITY

This application claims priority from an application entitled "Method For Recognizing Music Score Image With Automatic Accompaniment In Mobile Device" filed with the Korean Intellectual Property Office on Feb. 12, 2008 and assigned Serial No. 2008-12784, the contents of which are incorporated herein by reference in its entirety.

BACKGROUND OF THE INVENTION

1. Field of the Invention

The present invention relates to technology for recognizing a music score image included in an image. More particularly, the present invention relates to image recognition of musical notes and accompaniment chords which are included in a music score of an image.

2. Description of the Related Art

Recently, carrying a mobile terminal has become common practice, and many people use a personal mobile terminal not only for voice, but for many of types of communication, including data communication. As the mobile terminal becomes more recognized as a type of personal apparatus for people, rather than just for simple voice or data communication, the mobile terminal is actually used as a multimedia apparatus having various functions, such as an MP3 player, a camera, a video player, an electronic dictionary, a game player, etc.

Moreover, users increasingly desire a mobile terminal with more functionality when they "upgrade" to newer models, and desire an increasingly varied amount of functions for various purposes. Mobile terminal manufacturers have been trying to manufacture mobile terminals having increasingly varied functions in order to distinguish their products from those of other companies in order to meet the user's desire.

Meanwhile, with the recent development of the image recognition technology, various techniques for extracting a music score from image data, which is generated by scanning a music score printed on a sheet through use of an image recognition apparatus, such as a scanner, are being developed.

In an image that includes a music score, staff lines included within the music score act as large noise in detecting symbols of the music score by recognition technology, but at the same time, the staff lines are the most important information for analyzing and recognizing the symbols. Therefore, in a method of recognizing a music score included in an image, it is most important to detect and remove staff lines from the music score.

Since most music score images are generated by recognizing an original copy printed or written on paper as an image recognized through an image recognition apparatus, a music score included in a generated image may be inclined or bent. Conventionally, in order to solve these problems, vertical run-length coding, Hough conversion, line adjacency graph (LAG), DP matching, etc. are used in an attempt to overcome the noise generated by the staff lines. However, since the conventional methods target music score images, which are scanned at 300 dpi or higher, using an image recognition apparatus such as a scanner, there is a limitation that the methods can be applied only to music score images of good quality.

When a music score image is obtained through a camera provided in a mobile terminal (such as by photographing a paper copy), the image quality is poor, and distortion, such as the music score included in the image being inclined or bent, may occur in accordance with a location or angle at which the image has been photographed. As a result, it is difficult to recognize a music score included in an image obtained through a mobile terminal by using the above-mentioned methods. Due to such a limitation, music score recognition apparatuses equipped in mobile terminals are used only to extract simple melodies, and cannot induce users to make active use.

Accordingly, there has been a long-felt need in the art for a method of directly and accurately recognizing a music score included in a music score image which is obtained through a camera provided in a mobile terminal, and various information included in the music score, without requiring a separate editing program.

SUMMARY OF THE INVENTION

Accordingly, the present invention has been made to provide a method for rapidly and accurately removing staff lines from a music score included in an image, and at the same time, accurately recognizing information including musical notes and accompaniment chords, which are contained in the music score.

In accordance with an exemplary aspect of the present invention, there is provided a method for recognizing a music score included in an image, the method including the steps of: detecting a region with staff lines from the image including the music score; detecting a region with an accompaniment chord from the image including the music score by taking the region with the staff lines and a region with a musical note into consideration; extracting and removing the staff lines from the music score included in the image; recognizing the musical note by extracting the musical note from the image, from which the staff lines have been removed; recognizing the accompaniment chord by extracting the accompaniment chord from the image, from which the staff lines have been removed; and generating data for reproducing a sound source corresponding to the musical note and accompaniment chord.

The step of recognizing the accompaniment chord may include, for example the sub-steps of: dividing the accompaniment chord into a plurality of regions, and extracting a pattern vector corresponding to a rate of black pixels included in each divided region (i.e. "sub-region"); checking a difference value by matching the extracted pattern vector with predetermined pattern vectors; and recognizing, as the accompaniment chord, an accompaniment chord of a predetermined pattern vector most similar to the extracted pattern vector.

Preferably, according to an exemplary aspect of the present invention, the difference value between the extracted pattern vector and the predetermined pattern vectors can be checked by $$d(x, y^k) = \sqrt{\sum_{n=0}^{11}(x_n - y_n^k)^2},$$

in which "x" represents a region-by-region pattern vector of the extracted accompaniment chord, i.e. $x=[x0, x1, \ldots, xm]$, and "$y^k$" represents a region-by-region pattern vector of a $k^{th}$ accompaniment chord, i.e. $y^k=[y^k0, y^k1, \ldots, y^km]$.

Preferably, according to an exemplary aspect of the present invention, the accompaniment chord used in the music score includes an accompaniment key and an additional chord, and each of the accompaniment key and the additional chord is divided into a plurality of regions so as to extract a pattern vector.

According to another exemplary aspect of the present invention, the step of extracting and removing the staff lines may include the sub-steps of: dividing the staff lines into a plurality of regions by taking an inclination of the music score recognized as the image; estimating each line of the staff lines included in the music score with respect to each divided region, by analyzing a histogram of the image; extracting each line of the staff lines included in the music score based on the estimated staff lines; and removing each line of the extracted staff lines from the music score.

According to yet another exemplary aspect of the present invention, the step of estimating each line of the staff lines may include the sub-steps of: estimating an uppermost or lowermost line of the staff lines through use of a longitudinal histogram; and estimating each line included in the staff lines based on a histogram value of the uppermost or lowermost line.

Preferably, a width between each line included in the staff lines is taken into consideration when the each line of the staff lines is estimated.

According to another exemplary aspect of the present invention, the step of dividing the staff lines into the plurality of regions may include the sub-steps of: establishing the number of boundary lines for dividing the staff lines; uniformly dividing the staff lines in a longitudinal direction according to the number of boundary lines; identifying coordinates of intersections between the staff lines and the boundary lines used for the division of the staff lines within the image, and identifying an inclination of the staff lines; and determining the number of regions into which the staff lines are to be divided by taking the inclination into consideration.

According to still another exemplary aspect of the present invention, the step of dividing the staff lines into the plurality of regions includes the sub-steps of: establishing an initial value for the number of boundary lines for dividing the staff lines; uniformly dividing the staff lines in a longitudinal direction according to the number of boundary lines; identifying coordinates of intersections between the staff lines and the boundary lines which are used for division of the staff lines according to the initial value, and calculating differences in distance between the intersections; calculating an average value of the calculated differences in distance, and comparing the average value with a first predetermined threshold value; and identifying the number of intersections used in the above steps, and comparing the number of used intersections with a second predetermined threshold value. Here, when the average value is greater than the first predetermined threshold value, or when the number of intersections used in the above steps is less than the second predetermined threshold value, the number of intersections for division of the staff lines are re-established, the steps of uniformly dividing the staff lines, identifying differences in distance between the intersections, and calculating an average value of the identified differences are repeated.

In addition, when the average value is equal to or less than the first predetermined threshold value, or when the number of intersections used in the above steps is equal to or greater than the second predetermined threshold value, the staff lines are uniformly divided in a longitudinal direction according to the number of intersections used in the above steps.

According to an exemplary embodiment of the present invention a method for recognizing a music score included in an image, may include (a) detecting a first region with staff lines from an image including a music score;

(b) detecting a second region including musical notes that overlaps the first region;

(c) detecting a third region of the image having an accompaniment chord from the image including the music score by taking the first region with the staff lines and the second region with the musical note into consideration;

(d) extracting and removing the staff lines from the music score included in first region of the image;

(e) recognizing and extracting the musical note from the image, from the first region in which the staff lines have been removed;

(f) recognizing and extracting the accompaniment chord from the third region of the image; and (g) generating instructions for reproducing a sound source corresponding to the musical note and accompaniment chord.

BRIEF DESCRIPTION OF THE DRAWINGS

The above and other exemplary aspects, features and advantages of the present invention will be more apparent from the following detailed description taken in conjunction with the accompanying drawings, in which.

DETAILED DESCRIPTION

Hereinafter, exemplary embodiments of the present invention will be described with reference to the accompanying drawings. For the purposes of clarity and simplicity, a detailed description of known functions and configurations incorporated herein will be omitted when it may make the subject matter of the present invention rather unclear.

Figure 1:
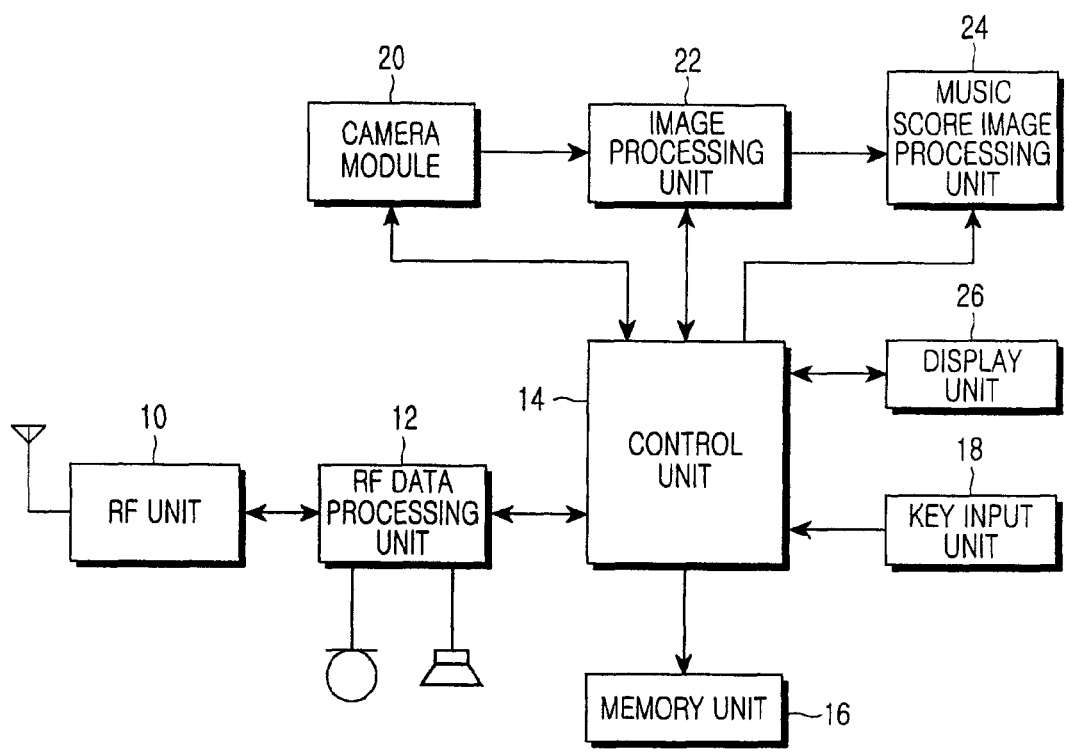
FIG. 1 is a block diagram illustrating the configuration of a mobile terminal to which the present invention is applied.

FIG. 1 is a block diagram illustrating an exemplary configuration of a mobile terminal to which the present invention is applied. An artisan should understand and appreciate that other configurations and even other types of devices are within the spirit of the invention and the scope of the appended claims. The present invention will now be described with a mobile terminal as an example selected from among various apparatuses capable of recognizing a digital music score image.

An example of a mobile terminal for recognizing a digital music score image and removing the staff lines of the music score image according to the present invention may include a camera 20, an image processing unit 22, a music score image processing unit 24, a display unit 26, a control unit 14, a memory unit 16, a key input unit 18, an RF unit 10, and an RF data processing unit 12.

The RF unit 10 modulates voices, characters, and/or control data input by a user into radio frequency signals, and transmits the radio frequency signals to a base station (not shown) over a mobile communication network. In addition, the RF unit 10 receives radio frequency signals from a base station, demodulates the received radio frequency signals to produce voices, characters, and control data, and then outputs the voices, characters, and control data. The RF data processing unit 12 decodes voice data received from the RF unit 10, outputs audible sounds corresponding to the decoded voice data through a speaker, outputs data corresponding to user's voice signals received from a microphone to the RF unit 10, and provides the control unit 14 with characters and control data received from the RF unit 10.

Still referring to FIG. 1, the camera 20 performs general digital camera functions under the control of the control unit 14. The image processing unit 22 converts image data received from the camera 20 into digital image data with a proper format (e.g. RAW, JPEG, or TIFF format).

The key input unit 18 is a device for receiving a telephone number or characters from a user, and includes keys for receiving numerals and character information, and function keys for setting various functions. It should be understood that a key unit does not have to have physical keys and could include an optical touch screen, being part of the display device 26. Also, the key input unit may comprise or include a voice command module. The display unit 26 may comprise a display device such as a liquid crystal display (LCD), or any other type of screen. The display unit 26 displays digital image data obtained through photographing, as well as messages on various operating states of a corresponding terminal.

The control unit 14 typically controls the general operation of the mobile terminal. That is, the control unit 14 performs processing operations according to numerals and menu selection signals received through the key input unit 18, processes signals input through the camera 20, and outputs images obtained through photographing by the camera and image output signals required for various operations of the mobile terminal to the display unit 26. In addition, the control unit 14 controls the operation of the music score image processing unit 24. Also, if necessary, the control unit 14 brings contents stored in the memory unit 16 in order to output the contents, or stores contents in the memory unit 16. The memory unit 16 stores data and a plurality of programs related to the operation of the control unit 14 and/or the device, and also may store programs for removing staff lines from a music score image and data generated when the staff-line removal program is executed. In addition, the memory unit is used to store various information required for using the mobile terminal.

The mobile terminal having the-aforementioned configuration such as in the example in FIG. 1 performs operations related to a function of removing the staff lines from a music score image, as well as operations related to general mobile communication services.

Moreover, according to the present invention, when performing an operation of removing the staff lines from a music score image, the mobile terminal binarizes an image obtained through photographing by the camera or an image including a music score, which has been received from an external electronic device, and calculates a histogram of the image. Next, the mobile terminal can estimate regions where the staff lines are located based on the histogram, and removes the staff lines and unnecessary objects from the image.

Hereinafter, an exemplary operation of removing the staff lines from a music score image according to an exemplary embodiment of the present invention will be described in detail with reference to accompanying drawings.

Figure 2:
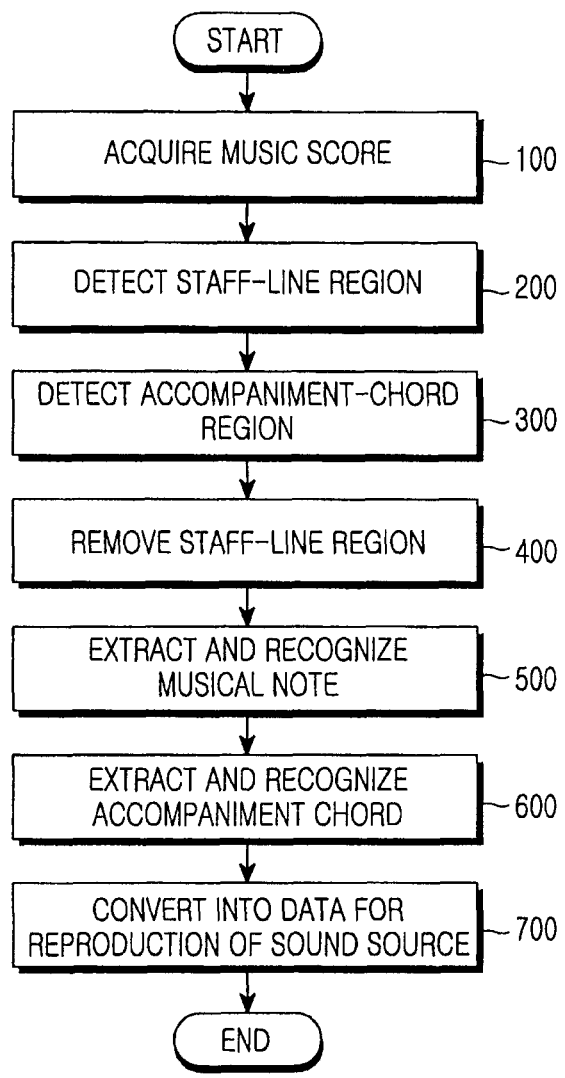
FIG. 2 is a flowchart illustrating one form of operation of a method for recognizing a music score image according to an exemplary embodiment of the present invention.

FIG. 2 is a flowchart illustrating exemplary operation of a method for recognizing a music score image according to an exemplary embodiment of the present invention. In step 100, which is performed before a step of removing the staff lines from a music score image, an image including a music score is acquired and then stored in a memory provided within a mobile terminal. Alternately, the image may be retrieved from memory. That is, in step 100, an image obtained by photographing a subject including a music score through the use of, for example, a camera provided within the mobile terminal may be stored, or an image (including a music score) received from an external electronic device (for example, a camera, a scanner, a personal computer, a server for storing and managing a music score image, etc.) through an interface capable of wire/wireless communication may be stored.

Next, in step 200, regions where the staff lines are located are detected through use of the histogram of the image. Here, since the staff lines, musical notes, and accompaniment chords have only to be able to be identified in the music score included in the image, the image may not be expressed in various colors. Therefore, in step 200, it is preferred that the image including the music score be first binarized. For example, the binarization step may be to express the image with two colors by taking into consideration a background color (for example, white) and an object color (for example, black) of the image including the music score. In addition, step 200 includes a step of calculating the histogram of the image after the image including the music score is binarized. Here, since music score information, including the staff lines, the musical notes, accompaniment chords, and words, may be distributed over the image including the music score, it is difficult to detect regions including the music score through use of a histogram of the width direction (for example, vertical direction) of the music score. Therefore, it is preferable to calculate a histogram in a longitudinal direction (for example, a horizontal direction) of the music score included in the image in order to accurately detect regions including the staff lines without unnecessary calculation of the histogram. Also, in step 200, regions where the staff lines are located can be detected by taking the calculated histogram into consideration. That is, regions where histogram values relatively larger than those in other regions are distributed are considered as regions (hereinafter, referred to as a staff-line region) where the staff lines exist, and are extracted as the staff-line regions.

Figure 3A:
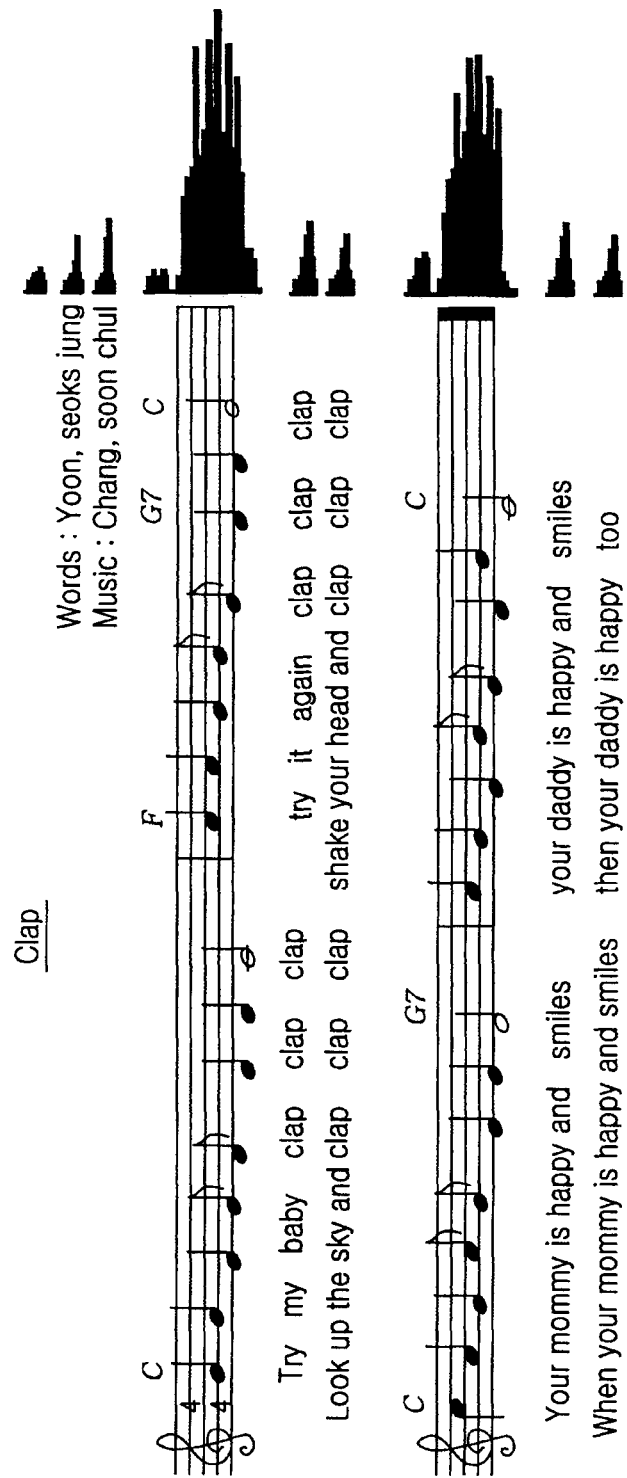
FIG. 3A is a view illustrating a result of a histogram calculation in a horizontal direction with respect to an image including a music score according to an exemplary embodiment of the present invention.
Figure 3B:
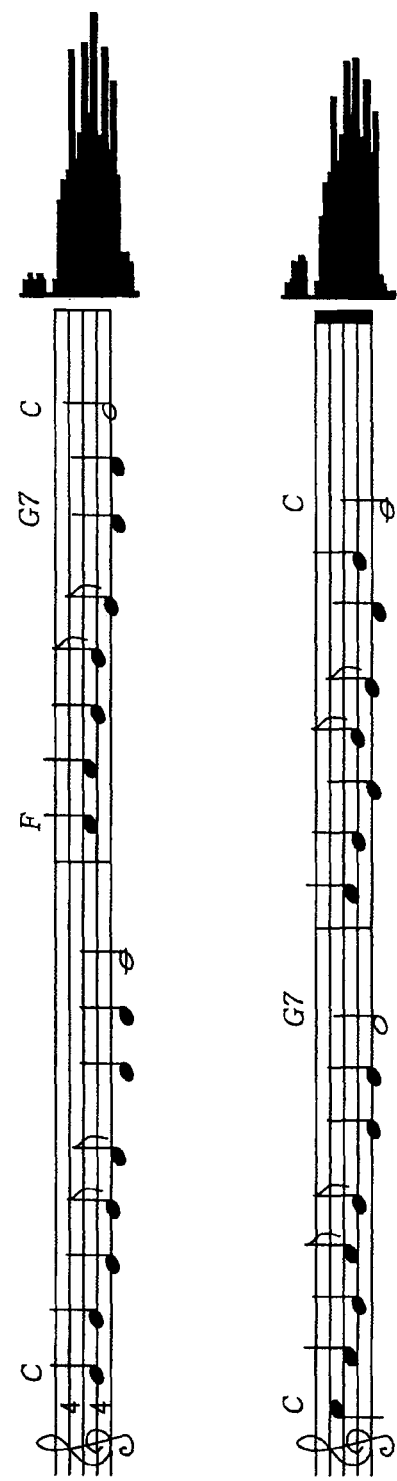
FIG. 3B is a view illustrating a result of a histogram calculation in a horizontal direction with respect to an image, from which the stuff-line regions have been extracted, according to an exemplary embodiment of the present invention.

FIG. 3A is a view illustrating a result of a histogram calculation in a horizontal direction with respect to an image including a music score according to an exemplary embodiment of the present invention, and FIG. 3B is a view illustrating a result of a histogram calculation in a horizontal direction with respect to an image, from which the stuff-line regions have been extracted, according to an exemplary embodiment of the present invention.

In step 200, first, a histogram of an image including a music score is calculated as shown in FIG. 3A. Then, in step 200, a connected component analysis is performed in a vertical direction for a horizontal histogram image, data runs of each connected component are accumulated, and then the connected regions where the accumulated value is equal to or higher than 75% of the maximum value of the accumulated values are estimated as staff-line regions. Next, staff-line regions are extracted as shown in FIG. 3B by removing regions (that is, regions for a title, words, a composer name, a songwriter name, etc.) other than the estimated staff-line regions.

Meanwhile, in step 300, regions where the accompaniment chords (e.g. C, F, G7, typically a combination of three or more tones played by an instrument such as a guitar or piano, etc.) are located are detected by taking into consideration the distribution characteristics of the accompaniment chords in the music score.

Generally, accompaniment chords are marked at a position at a certain distance from the uppermost line among staff lines. Therefore, when a horizontal histogram of a music score image is used, a void may be generated on the histogram due to the certain distance, and the void may be used to estimate staff-line regions and regions for piano chords.

Figure 4:
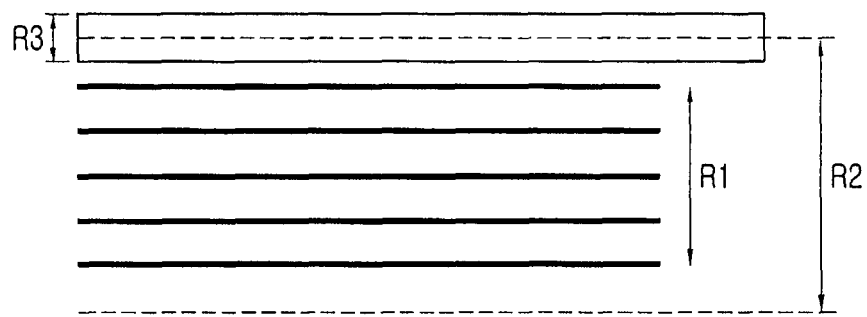
FIG. 4 is a view illustrating each region included in a music score image according to an exemplary embodiment of the present invention.

However, due to musical notes existing outside staff-line regions, it may be not always true that a distinct void is generated between the two kinds of regions. Referring now to FIG. 4, musical notes can exist only within a musical note existence region R2 for musical notes, and accompaniment chords can exist only within an accompaniment chord existence region R3. That is, the accompaniment chord existence region R3 is not overlapped with a staff-line region R1, but is partially overlapped with the musical note existence region R2. Therefore, in step 300, the musical note existence region R2 and the accompaniment chord existence region R3 are established based on the staff-line region detected in step 200.

After the staff-line region and the accompaniment chord existence region have been detected from the image including the music score, it is recommended as the next step to detect exact information (location information of each line, thickness, and distances between the staff lines) on the staff lines, and to remove objects other than objects related to the music score. However, when inclination or bending of the staff lines occurs on photographing the music score, it is difficult to accurately extract the staff-line region. In order to overcome such a problem, the image may be separately compensated before being extracted, but the compensation requires a large amount of power and takes a long time. Therefore, in step 400, it is preferable to divide the staff-line region included in the image in a longitudinal direction without separate compensation, to finally extract the staff lines, and then to remove the staff lines from the image.

Figure 5:
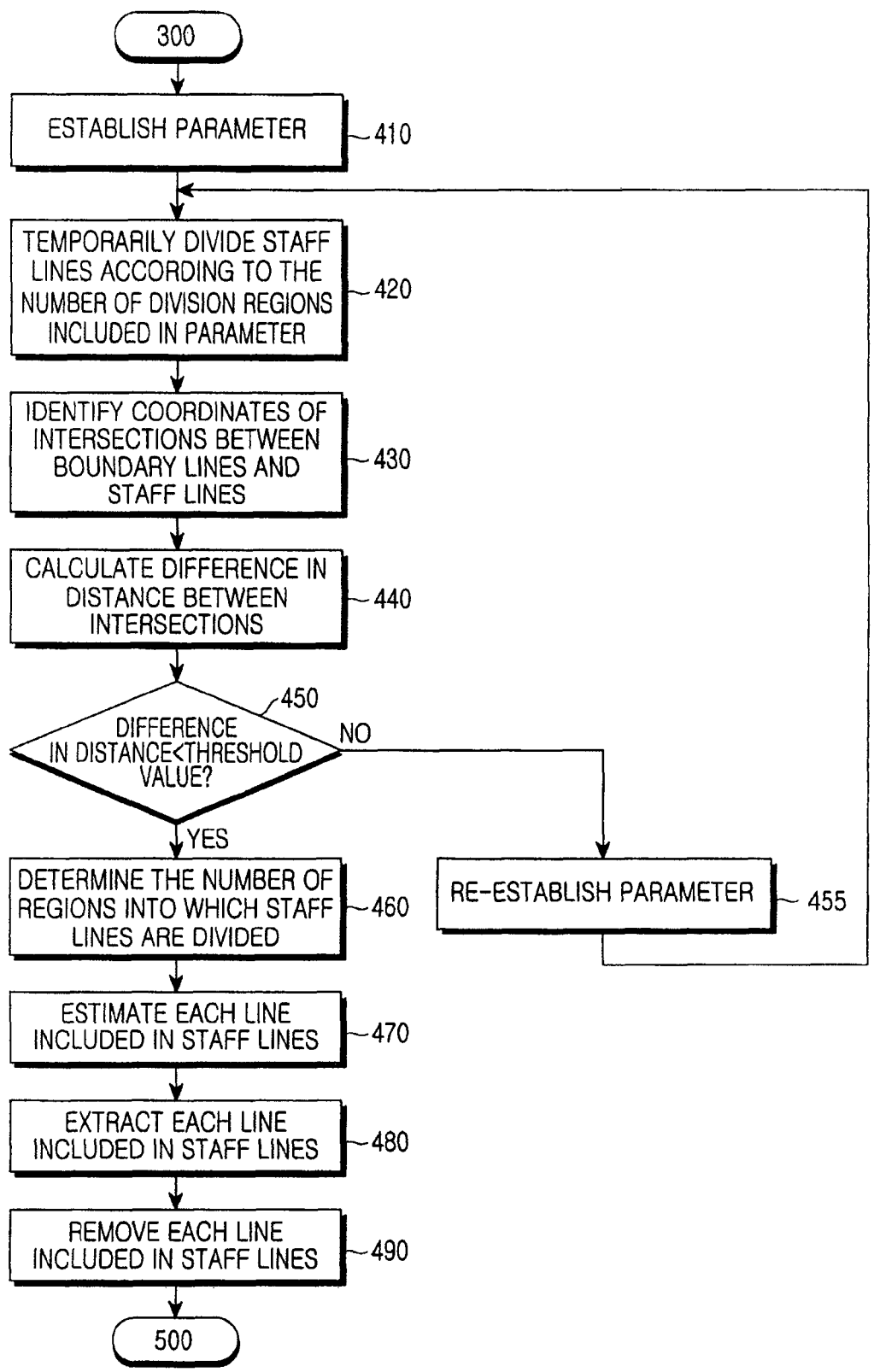
FIG. 5 is a detailed flowchart of exemplary operation regarding a step of removing the staff-line region in the method for recognizing a music score image according to an exemplary embodiment of the present invention.

FIG. 5 is a detailed flowchart of exemplary substeps of step 400 of removing the staff-line region in the method for recognizing a music score image according to an exemplary embodiment of the present invention. Step 400 (shown in FIG. 2) includes sub-steps 410 to 490 of FIG. 5. First, in step 410, a parameter value necessary for dividing the staff-line region is set. Here, the parameter value may be the number of division regions into which the staff-line region is to be divided, the number of boundary lines used for the division, or the like. For example, the number of division regions and the number of boundary lines used for the division may be calculated by equations 1 and 2 below, respectively:

$$\text{The number } (N) \text{ of division regions} = 4*t \qquad (1)$$

In equation 1, "t" represents a natural number increasing one by one, wherein the initial value of "t" is 1.

$$\text{The number } (K) \text{ of boundary lines used for division} = N-1 \qquad (2)$$

While equations 1 and 2 are exemplified as the parameter value according to an exemplary embodiment of the present invention, the present invention is not limited thereto, and the parameter value has only to be able to set the number of division regions or the number of boundary lines used for the division.

Still referring to FIG. 5, when the parameter value has been set through step 410, the staff-line region is divided in step 420 according to the number of division regions or the number of boundary lines used for the division.

Figure 6:
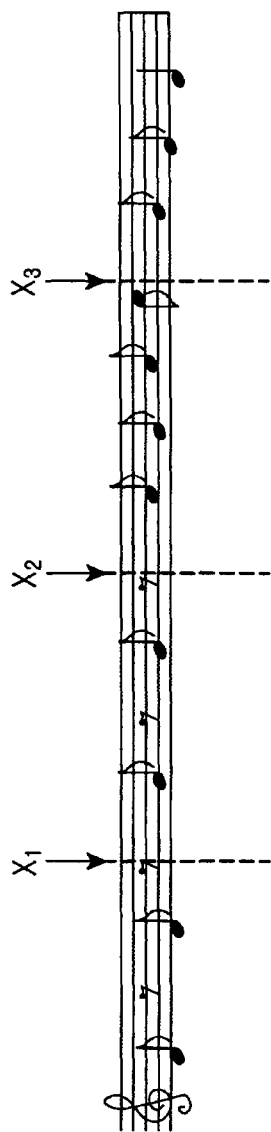
FIG. 6 is a view illustrating a music score image where staff lines are temporarily divided in the method for recognizing the music score image according to an exemplary embodiment of the present invention.

For example, with reference now to FIGS. 5 and 6, assuming that the longitudinal direction of the staff-line region is the horizontal direction, the entire width W in the horizontal direction of the staff-line region is divided into four regions having the same width, as shown in FIG. 6. In this case, the boundary lines used for the division may be X1, X2, and X3.

Next, in step 430, intersections between the staff lines and the boundary lines are extracted, and image coordinates corresponding to the intersections are checked. In this case, it is preferable to check the coordinates of intersections between the boundary lines and the top or bottom line among 5 lines included in the staff lines. However, the present invention is not limited thereto, and it is possible to check the coordinates of intersections between the boundary lines and any one line selected from among the 5 lines, as an example.

When the coordinates of the intersections have been checked in step 430, a sum of absolute values of differences in distance in a y direction between odd-numbered points, except for a $K^{th}$ point, is calculated in step 440. In addition, in step 440, an average value of differences in distance between all odd-numbered points (for example, total [(K/2)−1]) is calculated. Here, the sum of absolute values of differences in distance may be calculated, for example, by equation 3 below, and the average value of differences in distance may be calculated, for example, by equation 4 below.

$$dist_i = |y_{i+2} - y_{i+1}| + |y_{i+1} - y_i| \qquad (3)$$

$$dist_{avg} = \frac{\sum_{i=0}^{\frac{k}{2}-1} dist_i}{\frac{k}{2}-1} \qquad (4)$$

Next, in step 450, the average value for differences in distance, which has been calculated in step 440, is compared with a predetermined threshold value (e.g. 1). When the average value exceeds the predetermined threshold value as a result of the comparison, the value of variable "t" included in the parameter is increased in step 455, and steps 410 to 440 are repeatedly carried out. In contrast, the average value is equal to or less than the predetermined threshold value (e.g. 1.0) as a result of the comparison, the number of divisions of the staff-line region based on the parameter value set in step 410 is confirmed, and the staff-line region is divided according to the confirmed number of divisions in step 460.

Figure 7A:
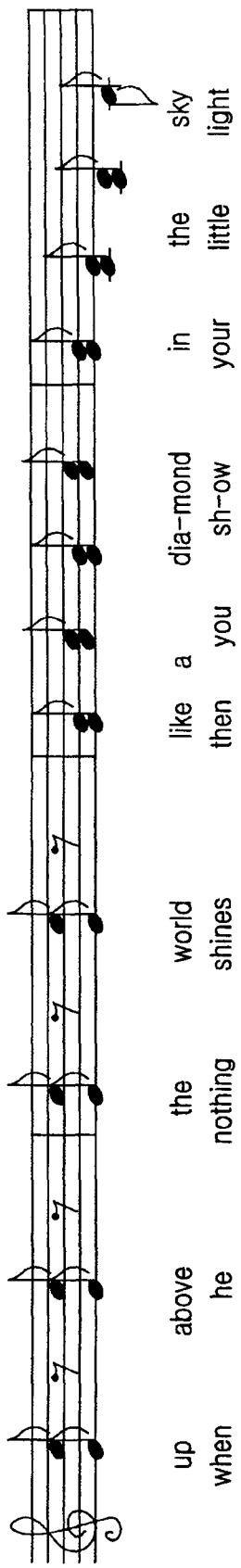
FIG. 7 is a view illustrating a result obtained by dividing staff-line regions in a longitudinal direction through use of the method for recognizing a music score image according to an exemplary embodiment of the present invention.
Figure 7B:
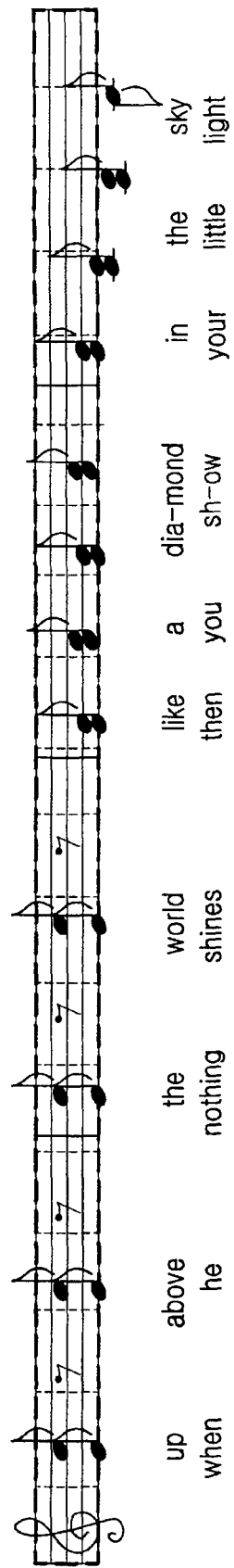
Figure 8A:
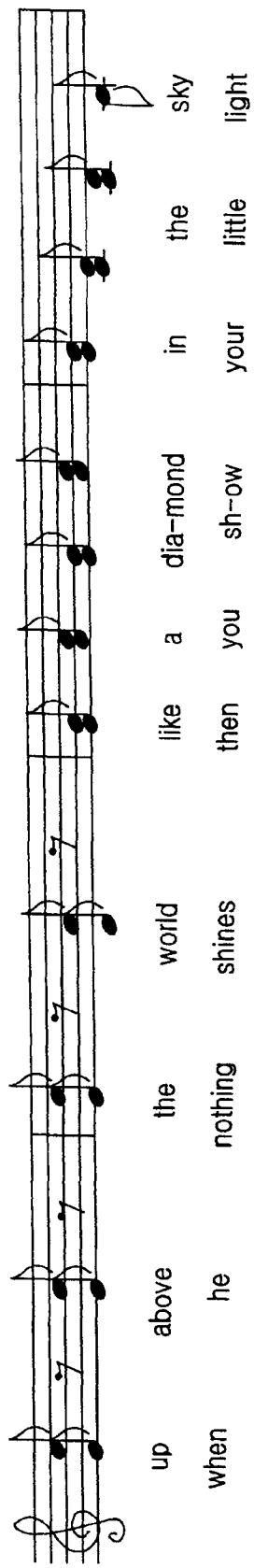
FIG. 8 is a view illustrating a result obtained by dividing staff-line regions inclined by about 2° in a longitudinal direction in the music score included in the image of FIG. 7.
Figure 8B:
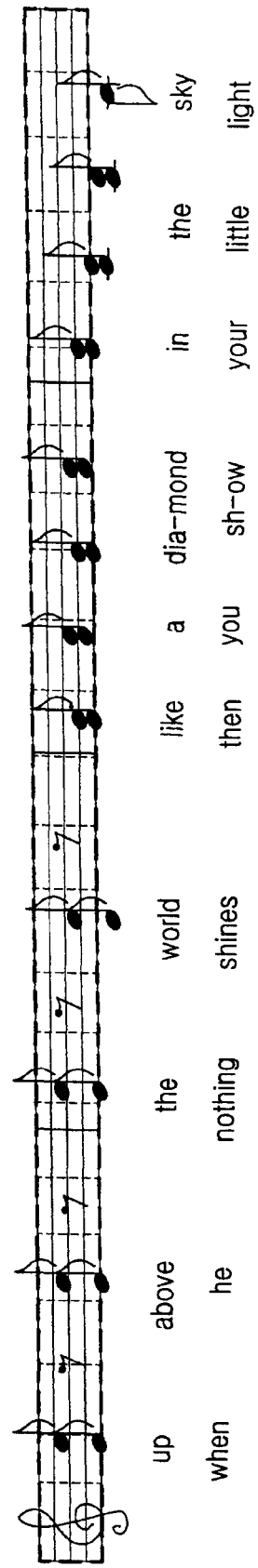

FIGS. 7A, 7B and 8A, 8B are views illustrating results obtained by dividing staff-line regions having different inclinations in a longitudinal direction through use of the method for recognizing a music score image according to an exemplary embodiment of the present invention. FIG. 7A illustrates an image where there is little inclination, and FIG. 8A illustrates an image where the staff-line region of FIG. 7A is inclined by about 2°. It can be understood that when the staff-line region included in the FIG. 7A is divided in a longitudinal direction according to the method of the present invention, the staff-line region is divided into 20 regions as shown in FIG. 7B. Similarly, it can be understood that when the staff-line region included in FIG. 8A is divided in a longitudinal direction according to the method of the present invention, the staff-line region is divided into 24 regions as shown in FIG. 8B. Therefore, according to the exemplary embodiment of the present invention, as the inclination of the music score image is larger, the staff-line region can be divided into a larger number of regions, so that it is possible to accurately extract the staff lines even though the staff-line region included in the image is inclined.

Meanwhile, in step 470, each line included in the staff lines is estimated in each divided region. Preferably, in step 470, a histogram in a longitudinal direction (e.g. a horizontal direction) of each divided region is calculated, and then each part where a value of the histogram exceeds a predetermined value may be estimated as a line included in the staff lines. That is, step 470 may be performed in such a manner as to compare a histogram "VHist(y)" in a longitudinal direction of each divided region to a predetermined threshold value "T," as shown in equation 5 below. In this case, the threshold value "T" can be obtained by equation 6 below.

$$VHist(y) > T \quad (5)$$

$$T = \frac{hist_{max} + hist_{avg}}{2} \quad (6)$$

In equation 6, "$hist_{max}$" represents a maximum value of histograms in the longitudinal direction, and "$hist_{avg}$" represents an average value of histograms in the longitudinal direction.

Figure 9:
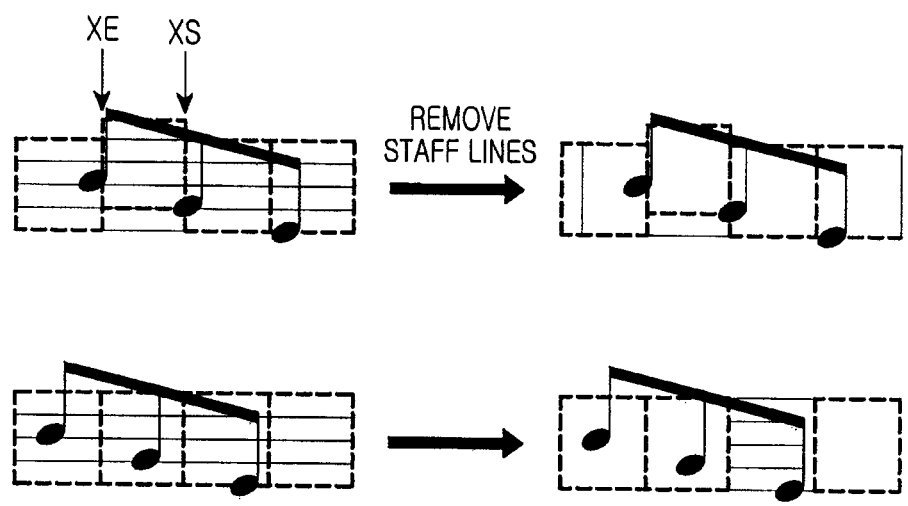
FIG. 9 is a view illustrating an image from which each line of staff lines is estimated and removed through use of the method for recognizing a music score image according to an exemplary embodiment of the present invention.

In addition, even if each line included in the staff lines is estimated in step 470, when the line is overlapped with an object, such as a beamed note included in the music score, it can be difficult to separate the line from the object (see FIG. 9). Therefore, according to an exemplary embodiment of the present invention, step 480 of extracting each line estimated in step 470 by separating the line from other objects included in the image is included. In step 480, the number $L(Line_j)$ of cases where a corresponding pixel or one upper or lower pixel of the corresponding pixel in each line is a black pixel is calculated as shown in equation 7 below. In addition, only when the calculated value is greater than 80% of the width of the division region, a corresponding line is considered as a candidate region of the staff lines, thereby solving the above problem.

$$L(Line_j) \geq (XE-XS+1) \times 0.8 \quad (7)$$

In equation 7, "XS" and "XE" represent a start point and an end point of the division region, respectively.

Figure 10:
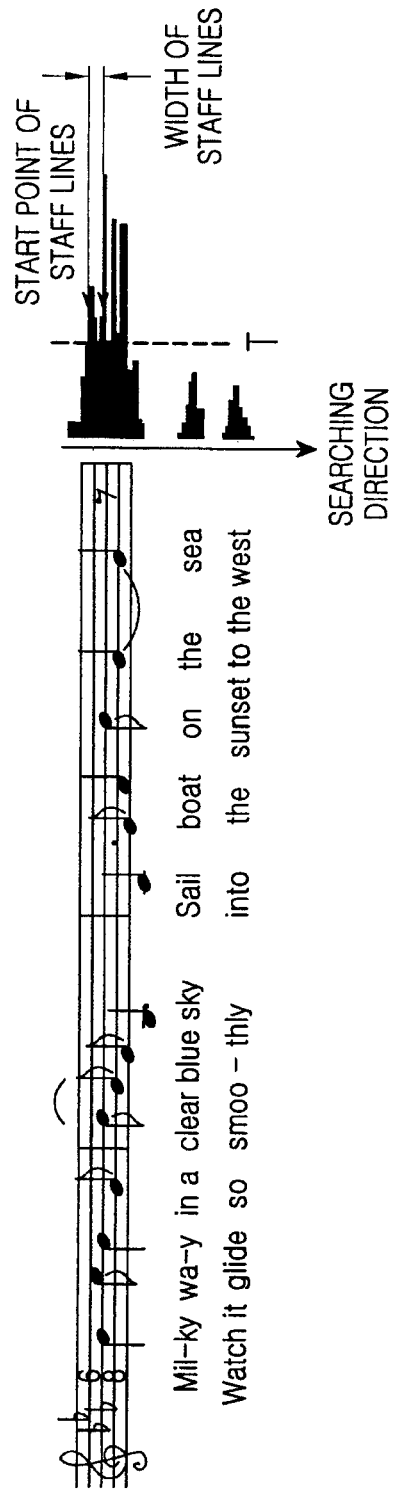
FIG. 10 is a view illustrating an image including a music score, a result of a histogram calculation in a horizontal direction, and a threshold value "T" according to an exemplary embodiment of the present invention.

Also, in step 480, the histogram in the horizontal direction is calculated with respect to each line estimated as one of the staff lines, as shown in FIG. 10. A first point has a value equal to or greater than the threshold value "T" is determined as the start point of the staff lines, and a length of the continuous points having a value equal to or greater than the threshold value "T" is determined as the thickness of the staff lines. Accordingly, the start point and the width of the staff lines are calculated.

In addition, in step 480, in order to more accurately extract the staff lines from the lines estimated as the staff lines, it is determined if another object, such as a tie, is included between the staff lines.

Figure 11:
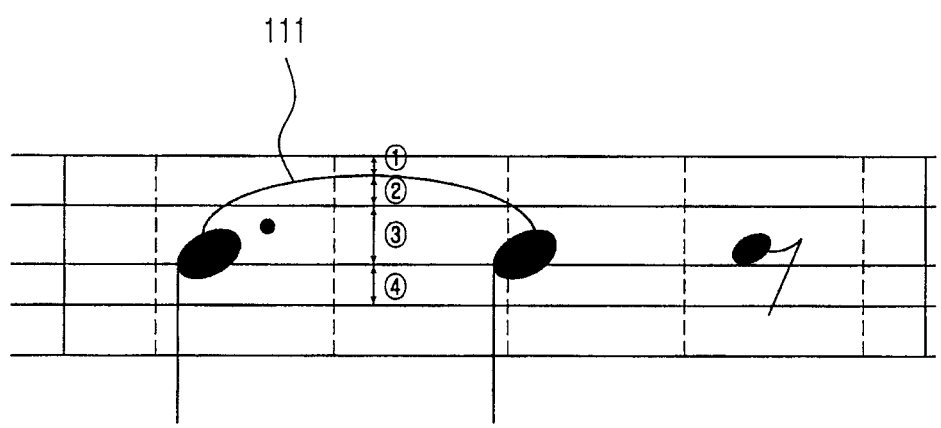
FIG. 11 is a view illustrating a region including a tie within a music score included in an image.
Figure 12:
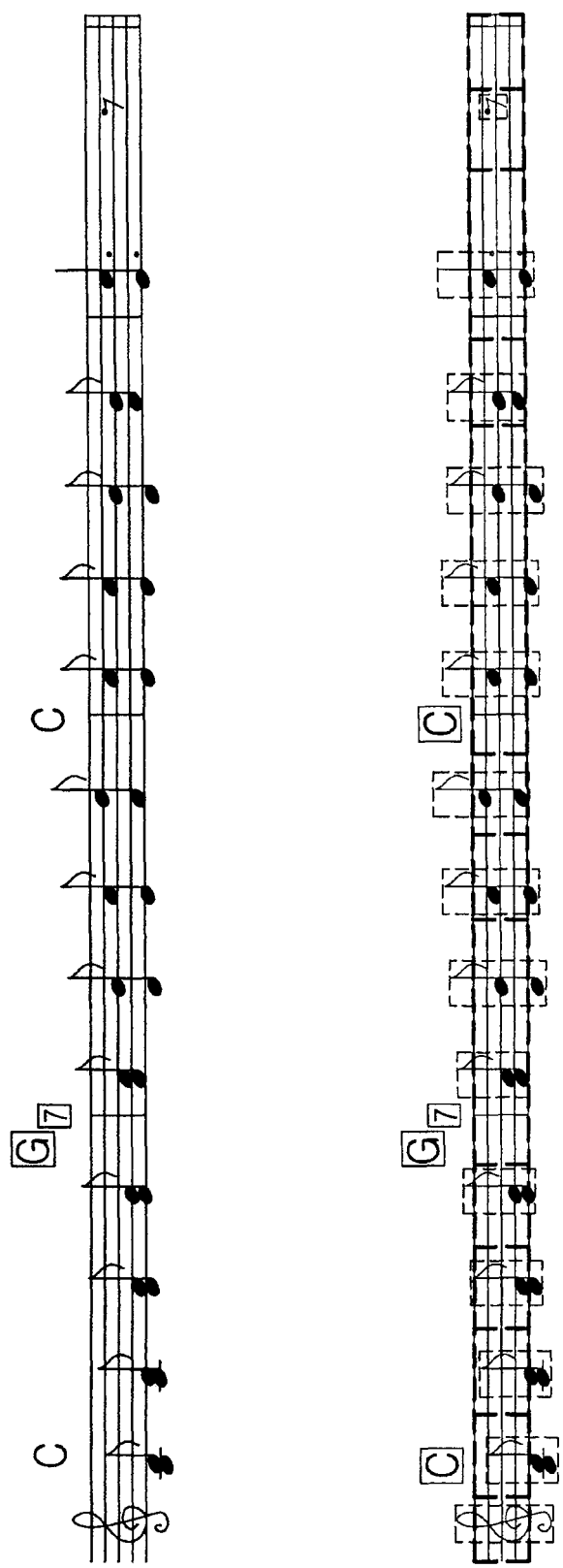
FIG. 12 is a view illustrating a music score from which staff-line regions are removed through use of the method for recognizing a music score image according to an exemplary embodiment of the present invention.

FIG. 11 is a view illustrating a music score image including staff lines. Referring to FIG. 11, it can be understood that sometimes there is a tie 111 between musical notes in the music score image. Since the staff lines are divided into n number of equal parts according to an exemplary embodiment of the present invention, there is difficulty in distinguishing the tie and the staff lines from each other when the histogram only in the horizontal direction is used. This difficulty is eliminated by comparing distances between the staff lines as follows. As shown in FIG. 11, when there is almost no difference between the sum of distances between two adjacent lines of the estimated staff lines and the next distance of the estimated staff lines, it is determined that there is a tie between musical note 1 and musical note 2, and the line between musical note 1 and musical note 2 is removed from the candidate of the staff lines. Also, when the difference in distance between the estimated staff lines is equal to or more than 5 pixels, a corresponding line is determined not to be included in the staff lines, and is removed from the candidate of the staff lines.

Through step 480 described above, each line included in the staff-line region has been extracted.

Next, the staff-line region extracted in step 480 is removed from the image in step 490. Also, when a length corresponding to the number of black pixels connected with each other is equal to or longer than 1.5 times the width of the staff lines, corresponding coordinates are removed. After the staff lines are removed, a procedure of removing noise is additionally performed. In the procedure of removing noise, elements made of connected black pixels are combined into one object through use of the connected component analysis. Then, when the width of the extracted object is less than ¼ times the distance of the staff lines, the extracted object is determined as noise and is removed.

Through step 400 (i.e. steps 410 to 490) described above, the staff lines included in a music score image can be accurately extracted and removed even though the staff lines are inclined or bent.

Next, in step 500, the horizontal and vertical histograms that are in a state where the staff lines have been removed are then analyzed to extract each musical note located within the musical note existence region (see FIG. 2). Then, each extracted musical note is recognized by matching each extracted musical note with predetermined musical note patterns.

Next, in step 600, the horizontal and vertical histograms that are in a state where the staff lines are removed are analyzed to extract each accompaniment chord located within the accompaniment chord existence region. Then, each extracted accompaniment chord is recognized by matching each extracted accompaniment chord with predetermined accompaniment chord patterns.

The following description will be given on a procedure of recognizing each extracted accompaniment chord according to an exemplary embodiment of the present invention. According to an exemplary embodiment of the present invention, it is assumed that the accompaniment chords are piano accompaniment chords inserted for piano accompaniment. However, it is to be understood that the accompaniment chords could be for various instruments (including but in no way limited to harpsichord, guitar, and sitar, just to name a few possibilities).

Figure 13:
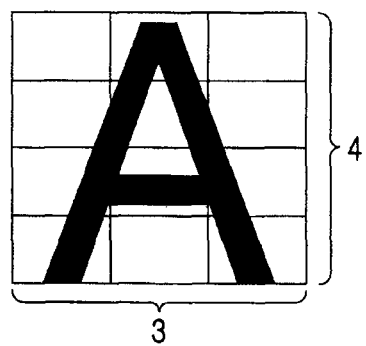
FIG. 13 is a view illustrating an accompaniment chord divided into regions through use of the method for recognizing a music score image according to an exemplary embodiment of the present invention.

First, before the procedure of recognizing accompaniment chords is performed, pattern vectors for 7 reference keys are generated through a preprocessing procedure, and are stored in a storage medium in advance. In this case, one of various types of characters (e.g. Times new Roman, Courier New, Arial, etc.) may be selectively used in a music score. Therefore, in order to ensure the reliability of the pattern vectors, it is preferable to calculate N (e.g. 100) pattern vectors for different types of characters, and to create a pattern vector for each key by using the average value of the calculated vectors. In addition, a pattern vector for each key may be a value indicating a rate of black pixels included in each region of M×N regions (e.g. 3×4 regions), into which an area is divided (see FIG. 13).

Meanwhile, each extracted accompaniment chord is divided into M×N regions (e.g. 3×4 regions). A pattern vector for a rate of black pixels included in each region of the M×N regions, into which each extracted accompaniment chord is divided, is generated. Then, by matching the generated pattern vector with the predetermined pattern vectors, a pattern vectors having a most similar value is detected from the predetermined pattern vectors.

The detection of the pattern vector can be achieved by calculating a Euclidean distance of the predetermined pattern vector with respect to the pattern vector generated according to each region. The Euclidean distance may be obtained by equation 8 below.

$$d(x, y^k) = \sqrt{\sum_{n=0}^{11} (x_n - y_n^k)^2} \quad (8)$$

In equation 8, "x" represents a region-by-region pattern vector a detected accompaniment chord, wherein x=[x0, x1, ..., xm], and "$y^k$" represents a region-by-region pattern vector of a $k^{th}$ key (i.e. A, B, C, D, E, F, and G), wherein $y^k$=[$y^k$0, $y^k$1, ..., $y^k$m].

Also, the accompaniment chords may include additional chords (e.g. #(sharp), b(flat), m(minor) and maj(major) on the right side of accompaniment keys (i.e. A, B, C, D, E, F, and G). Therefore, when the accompaniment chords include additional chords, the additional chords added to the accompaniment chords may be identified in the same manner as the aforementioned accompaniment key detection method.

Finally, in step 700, a MIDI conversion for an accompaniment part is performed through a multi-track of a MIDI format, based on the musical notes extracted in step 500 and the accompaniment chords extracted in step 600.

As described above, according to the method for recognizing a music score image, accompaniment chords can be relatively easily separated and recognized as compared with the conventional method, so that it is possible to provide users with accurately reproduced sound sources in a musical performance.

While the present invention has been shown and described with reference to certain exemplary embodiments thereof, the present invention is not limited thereto, and it will be understood by those skilled in the art that various changes in form and details may be made therein without departing from the spirit and scope of the invention as defined by the appended claims.

What is claimed is:

1. A method for recognizing a music score included in an image, the method comprising:
   (a) detecting a first region with staff lines from the image including the music score;
   (b) detecting a second region, overlapping the first region, from the image, with the second region including a musical note;
   (c) detecting a third region, distinct from the first region, from the image, with the third region having an alphanumeric accompaniment chord notation and lacking staff lines, by taking the first region with the staff lines and the second region with the musical note into consideration using distribution characteristics;
   (d) extracting and removing the staff lines from the music score included in the first region of the image;
   (e) recognizing and extracting the musical note from the first region of the image in which the staff lines have been removed;
   (f) recognizing and extracting the accompaniment chord notation from the third region of the image; and
   (g) generating instructions for reproducing a sound source corresponding to the musical note and accompaniment chord notation.

2. The method as claimed in claim 1, where the instructions comprise data representing the musical note and the accompaniment chord notation.

3. The method as claimed in claim 1, wherein recognizing the accompaniment chord notation in step (f) comprises:
   dividing the third region having the accompaniment chord notation into a plurality of sub-regions, and extracting a pattern vector corresponding to a rate of black pixels included in each divided region;
   checking a difference value by matching the extracted pattern vector with predetermined pattern vectors; and
   recognizing a predetermined pattern vector most similar to the extracted pattern vector as the accompaniment chord notation.

4. The method as claimed in claim 3, wherein the difference value between the extracted pattern vector and the predetermined pattern vectors is checked by $$d(x, y^k) = \sqrt{\sum_{n=0}^{11} (x_n - y_n^k)^2},$$

in which "x" represents a region-by-region pattern vector of the extracted accompaniment chord notation, i.e. x=[x0, x1, ..., xm], and "$y^k$" represents a region-by-region pattern vector of a $k^{th}$ accompaniment chord notation, i.e, $y^k$=[$y^0$, $y^{k1}$, ..., $yk^m$].

5. The method as claimed in claim 3, wherein the accompaniment chord notation in the music score comprises at least one accompaniment key and an additional chord, and each accompaniment key and the additional chord are divided into a plurality of sub-regions for extracting a pattern vector.

6. The method as claimed in claim 1, wherein the step of extracting and removing the staff lines comprises:
   dividing the staff lines in the first region into a plurality of sub-regions by determining an inclination of the music score recognized as the image;

estimating each line of the staff lines included in the music score with respect to each sub-region, by analyzing a histogram of the image;

extracting each line of the staff lines included in the music score based on the estimated staff lines; and removing each line of the extracted staff lines from the music score.

7. The method as claimed in claim 6, wherein the step of estimating each line of the staff lines comprises:

estimating an uppermost or lowermost line of the staff lines through use of a longitudinal histogram; and estimating each line included in the staff lines based on a histogram value of the uppermost or lowermost line.

8. The method as claimed in claim 7, wherein a width between each line included in the staff lines is taken into consideration when each line of the staff lines is estimated.

9. The method as claimed in claim 6, wherein the step of dividing the staff lines into the plurality of sub-regions comprises:

establishing the number of boundary lines for dividing the staff lines;

uniformly dividing the staff lines in a longitudinal direction according to the number of boundary lines;

identifying coordinates of intersections between the staff lines and the boundary lines used for the division of the staff lines within the image, and identifying an inclination of the staff lines; and determining the number of sub-regions into which the staff lines are to be divided by taking the inclination into consideration.

10. The method as claimed in claim 5, wherein the step of dividing the staff lines into the plurality of sub-regions comprises:

establishing an initial value for the number of boundary lines for dividing the staff lines;

uniformly dividing the staff lines in a longitudinal direction according to the number of boundary lines;

identifying coordinates of intersections between the staff lines and the boundary lines which are used for division of the staff lines according to the initial value, and calculating differences in distance between the intersections;

calculating an average value of the calculated differences in distance, and comparing the average value with a first predetermined threshold value; and identifying the number of intersections used in the above steps, and comparing the number of used intersections with a second predetermined threshold value, in which when the average value is greater than the first predetermined threshold value, or when the number of intersections used in the above steps is less than the second predetermined threshold value, the number of intersections for division of the staff lines are re-established, the steps of uniformly dividing the staff lines, identifying differences in distance between the intersections, and calculating an average value of the identified differences are repeated; and when the average value is equal to or less than the first predetermined threshold value, or when the number of intersections used in the above steps is equal to or greater than the second predetermined threshold value, the staff lines are uniformly divided in a longitudinal direction according to the number of intersections used in the above steps.

11. The method according to claim 9, wherein the number of sub-regions are calculated by:

The number (N) of sub-regions=4*t;

wherein "t" represents a natural number increasing one by one, and wherein an initial value of "t" is 1.

12. The method according to claim 11, wherein the number of boundary lines are calculated by:

(K) boundary lines used for division=N−1.

13. The method according to claim 10, wherein, for each value of i=0 to (k/2)−1 for each $k^{th}$ accompaniment chord notation, a sum of absolute values of the identified differences in distance is calculated by:

$$dist_i = |y_{i+2} - y_{i+1}| + |y_{i+1} - y_i|; \text{ and}$$

wherein the average value of differences are calculated by:

$$dist_{avg} = \frac{\sum_{i=0}^{\frac{k}{2}-1} dist_i}{\frac{k}{2}-1}.$$

14. A mobile apparatus for recognizing a musical score image with automatic accompaniment comprising:

a camera module;

an image processing unit that receives an input image from the camera module;

a music score image processing unit that processes the musical score image from the input image;

an RF unit and an RF data processing unit;

a control unit that controls the camera module, the RF data processing unit, the music score image processing unit, and a memory, wherein the music score image processing unit comprises:

means for detecting a first region with staff lines from the music score image including a music score;

means for detecting a second region, overlapping the first region, from the music score image, with the second region including a musical note;

means for detecting a third region, distinct from the first region, from the music score image, with the third region having an alphanumeric accompaniment chord notation and lacking staff lines, by taking the first region with the staff lines and the second region with the musical note into consideration using distribution characteristics;

means for extracting and removing the staff lines from the music score image included in the first region;

means for recognizing and extracting, from the first region of the music score image, the musical note in which the staff lines have been removed;

means for recognizing and extracting the accompaniment chord notation from the third region of the music score image; and means for generating instructions for reproducing a sound source corresponding to the musical note and accompaniment chord notation.

15. The apparatus according to claim 14, wherein the mobile apparatus comprises a portable mobile terminal for voice and data communications.

16. A method for recognizing a music score included in an image, the method comprising:

(a) detecting a first region with staff lines from an image including a music score;

(b) detecting a second region including musical notes that overlaps the first region;

(c) detecting a third region, distinct from the first region, from the image, with the third region having an alphanumeric accompaniment chord notation and lacking staff lines from the image including the music score by taking the first region with the staff lines and the second region with the musical note into consideration with distribution characteristics, with the accompaniment chord notation in the music score including at least one accompaniment key and an additional chord, and each accompaniment key and the additional chord are divided into a plurality of sub-regions for extracting a pattern vector;

(d) extracting and removing the staff lines from the music score included in first region of the image;

(e) recognizing and extracting the musical note from the image, from the first region in which the staff lines have been removed;

(f) recognizing and extracting the accompaniment chord notation from the third region of the image; and (g) generating instructions for reproducing a sound source corresponding to the musical note and accompaniment chord notation;

wherein recognizing the accompaniment chord notation in step (f) comprises:

(f1) dividing the third region having the accompaniment chord notation into a plurality of sub-regions, and extracting a pattern vector corresponding to a rate of black pixels included in each divided region;

(f2) checking a difference value by matching the extracted pattern vector with predetermined pattern vectors; and (f3) recognizing a predetermined pattern vector most similar to the extracted pattern vector as the accompaniment chord notation; and wherein the step (f1) of dividing the staff lines into the plurality of sub-regions comprises:

establishing an initial value for the number of boundary lines for dividing the staff lines;

uniformly dividing the staff lines in a longitudinal direction according to the number of boundary lines; and identifying coordinates of intersections between the staff lines and the boundary lines which are used for division of the staff lines according to the initial value, and calculating differences in distance between the intersections.

17. The method according to claim 16, further comprising:

calculating an average value of the calculated differences in distance;

wherein, for each value of i=0 to (k/2)−1 for each $k^{th}$ accompaniment chord notation, a sum of absolute values of the identified differences in distance is calculated by:

$$dist_i = |y_{i+2} - y_{i+1}| + |y_{i+1} - y_i|; \text{ and}$$

wherein the average value of differences are calculated by:

$$dist_{avg} = \frac{\sum_{i=0}^{\frac{k}{2}-1} dist_i}{\frac{k}{2} - 1}.$$

18. The method as claimed in claim 16, where the instructions comprise data representing the musical note and the accompaniment chord notation.

19. The method as claimed in claim 16, wherein the step of extracting and removing the staff lines comprises:

dividing the staff lines in the first region into a plurality of sub-regions by determining an inclination of the music score recognized as the image;

estimating each line of the staff lines included in the music score with respect to each sub-region, by analyzing a histogram of the image;

extracting each line of the staff lines included in the music score based on the estimated staff lines; and removing each line of the extracted staff lines from the music score.

20. The method as claimed in claim 16, further comprising the step of:

receiving the image including the music score from a camera.

* * * * *

UNITED STATES PATENT AND TRADEMARK OFFICE
CERTIFICATE OF CORRECTION

PATENT NO. : 8,442,325 B2
APPLICATION NO. : 12/369113
DATED : May 14, 2013
INVENTOR(S) : Tae-Hwa Hong et al.

It is certified that error appears in the above-identified patent and that said Letters Patent is hereby corrected as shown below:

In the Claims

Column 16, Claim 17, Line 8 should read as follows:
--…$dist_i = |y_{i+2} - y_{i+1}| + |y_{i+1} - y_i|$; and…--

Signed and Sealed this
Eighteenth Day of June, 2013

Teresa Stanek Rea
*Acting Director of the United States Patent and Trademark Office*